United States Patent
Soon-Shiong

(10) Patent No.: US 10,762,470 B2
(45) Date of Patent: Sep. 1, 2020

(54) VIRTUAL PLANOGRAM MANAGEMENT SYSTEMS AND METHODS

(71) Applicant: Nant Holdings IP, LLC, Culver City, CA (US)

(72) Inventor: Patrick Soon-Shiong, Los Angeles, CA (US)

(73) Assignee: Nant Holdings IP, LLC, Culver City, CA (US)

( * ) Notice: Subject to any disclaimer, the term of this patent is extended or adjusted under 35 U.S.C. 154(b) by 0 days.

(21) Appl. No.: 16/226,494

(22) Filed: Dec. 19, 2018

(65) Prior Publication Data

US 2019/0122170 A1  Apr. 25, 2019

Related U.S. Application Data

(60) Continuation of application No. 15/918,976, filed on Mar. 12, 2018, now Pat. No. 10,198,712, which is a
(Continued)

(51) Int. Cl.
*G06Q 30/06* (2012.01)
*G06Q 10/08* (2012.01)
(Continued)

(52) U.S. Cl.
CPC ......... *G06Q 10/087* (2013.01); *G06F 3/0484* (2013.01); *G06K 9/00624* (2013.01); *G06K 9/00671* (2013.01); *G06Q 30/06* (2013.01); *G06Q 30/0633* (2013.01); *G06Q 30/0643* (2013.01); *G06T 19/006* (2013.01)

(58) Field of Classification Search
USPC ............... 705/16, 26.61; 345/633; 382/103
See application file for complete search history.

(56) References Cited

U.S. PATENT DOCUMENTS 6,026,376 A * 2/2000 Kenney ............... G06Q 30/06
705/26.61
7,016,532 B2  3/2006 Boncyk et al.
(Continued)

FOREIGN PATENT DOCUMENTS

JP  2001-265957 A  9/2001
JP  2005-031961 A  2/2005
(Continued)

OTHER PUBLICATIONS

Lo, "Shop Multiple Retailers in One Race Online With Suddenlee—A Service That Sends People to Stores to Shop for You", Racked.com, Jun. 27, 2011, 2 pages.
(Continued)

*Primary Examiner* — Oluseye Iwarere
*Assistant Examiner* — Reva R Moore
(74) *Attorney, Agent, or Firm* — Mauriel Kapouytian Woods LLP; Lana Akopyan; Andrew A. Noble

(57) ABSTRACT

Systems and methods of constructing and managing virtual planograms are presented. Contemplated systems allow for construction of a virtual planogram, which can be used to present consumers virtual inventory items as being available for purchase via a display device. The display device can include an electronic billboard within an establishment, a mall for example, or include a user's smart device, a cell phone or tablet for example.

22 Claims, 10 Drawing Sheets

Related U.S. Application Data division of application No. 15/213,154, filed on Jul. 18, 2016, now Pat. No. 9,953,288, which is a continuation of application No. 14/528,852, filed on Oct. 30, 2014, now Pat. No. 9,536,218, which is a division of application No. 13/667,965, filed on Nov. 2, 2012, now Pat. No. 9,430,752, which is a division of application No. 13/667,988, filed on Nov. 2, 2012, now Pat. No. 9,336,508.

(51) Int. Cl.
*G06K 9/00* (2006.01)
*G06F 3/0484* (2013.01)
*G06T 19/00* (2011.01)

(56) References Cited

U.S. PATENT DOCUMENTS

| | | |
|---|---|---|
| 7,266,511 B2 | 9/2007 | Teshima |
| 7,657,457 B2 | 2/2010 | Razumov |
| 7,685,023 B1 | 3/2010 | Abraham et al. |
| 7,881,529 B2 | 2/2011 | Boncyk et al. |
| 7,899,243 B2 | 3/2011 | Boncyk et al. |
| 7,899,252 B2 | 3/2011 | Boncyk et al. |
| 8,229,800 B2 | 7/2012 | Trotman et al. |
| 9,336,508 B2 | 5/2016 | Soon-Shiong |
| 9,430,752 B2 | 8/2016 | Soon-Shiong |
| 9,953,288 B2 | 4/2018 | Soon-Shiong |
| 2003/0154141 A1 | 8/2003 | Capazario et al. |
| 2007/0050235 A1* | 3/2007 | Ouimet ............ G06Q 10/06375 705/7.31 |
| 2008/0162262 A1 | 7/2008 | Perkins |
| 2008/0208715 A1 | 8/2008 | Hod et al. |
| 2009/0059270 A1 | 3/2009 | Opalach et al. |
| 2009/0149199 A1 | 6/2009 | Maghoul |
| 2009/0281903 A1 | 11/2009 | Blatstein |
| 2010/0070365 A1 | 3/2010 | Siotia et al. |
| 2010/0114726 A1 | 5/2010 | Lee et al. |
| 2010/0205043 A1 | 8/2010 | Edwards |
| 2011/0015966 A1 | 1/2011 | Wasco |
| 2012/0095853 A1 | 4/2012 | Bose et al. |
| 2012/0195460 A1* | 8/2012 | Lawrence Ashok Inigo ............... G06F 3/011 382/103 |
| 2012/0233015 A1 | 9/2012 | Calman et al. |
| 2012/0249588 A1* | 10/2012 | Tison ................ G06F 1/1696 345/633 |
| 2012/0310727 A1 | 12/2012 | Bradley et al. |
| 2013/0030915 A1 | 1/2013 | Statler et al. |
| 2013/0097050 A1* | 4/2013 | Soracco ............ G06Q 30/0621 705/26.5 |
| 2013/0317950 A1 | 11/2013 | Abraham et al. |
| 2014/0085333 A1 | 3/2014 | Pugazhendhi et al. |
| 2015/0058164 A1 | 2/2015 | Soon-Shiong |

FOREIGN PATENT DOCUMENTS

| | | | |
|---|---|---|---|
| JP | 2005-099956 A | 4/2005 | |
| JP | 2009-277224 A | 11/2009 | |
| JP | 2011-253324 A | 12/2011 | |
| KR | 20010079194 A | 8/2001 | |
| KR | 20010093985 A | 10/2001 | |
| KR | 20020007584 A | 1/2002 | |
| KR | 10-2004-0011056 A | 2/2004 | |
| KR | 2011-0136029 A | 12/2011 | |
| KR | 20110136029 A | 12/2011 | |
| KR | 20120104713 A | 9/2012 | |
| WO | WO 01/22308 A2 | 3/2001 | |
| WO | WO 01/37540 A2 | 5/2001 | |
| WO | WO 2009/027839 A2 | 5/2009 | |
| WO | WO 2010/110977 A2 | 9/2010 | |
| WO | WO 2012/075589 A1 | 6/2012 | |

OTHER PUBLICATIONS

Duffy, "Slotting Fees", OLR Research Report, http://www.cga.ct.gov/2007/rpt/2007-R-0667.htm, Nov. 20, 2007, 3 pages.
Zhu et al., "Design of the PromoPad: an Automated Augmented Reality Shopping Assistant", 12th Americas Conference on Information Systems, Aug. 4-6, 2006, Acapulco, Mexico, 16 pages.
International Search Report and Written Opinion issued in International Application No. PCT/US2013/068160 dated Feb. 26, 2014, 17 pages.
Van Camp, "South Korean Supermarket chain Opens Virtual Grocery Stores in Sunways", Digital Trends, http://www.digitaltrends.com/cool-tech/south-korean-supermarket-chain-opens-virtual-grocery-stores-in-subways/, Jul. 7, 2011, 3 pages.
Riedl, "Poshmark Opens the Door to Real-Time Curation With Showrooms", PRNewswire, Aug. 8, 2012, 2 pages.
Karlsson et al., "The vSLAM Algorithm for Robust Localization and Mapping", Proc. of Int. Conf. on Robotics and Automation (ICRA), 2005, 6 pages.
Swartz, "Shopping will never be the same Digital fitting rooms, 3-D printers and businesses mining your data? Yes, the future of retail is upon us", USA Today, Aug. 9, 2012, 3 pages.
Malcolm, "Touch-Screens Create Online Shopping Experiences At Stores", USA Today/ Money, Feb. 8, 2012, 6 pages.
Strother, "Shopping by Phone at South Korea's Virtual Grocery", BBC News, PRI's The World, Oct. 21, 2011, 11 pages.
Owen et al., "What is the best fiducial?", Michigan State University, Media and Entertainment Technologies Lab Media Interface and Network Design Lab, 8 pages.
Extended European Search Report issued in European Patent Application No. 13852221.4 dated Mar. 1, 2016, 7 pages.
Office Action issued in Korean Patent Application No. 10-2015-7014550 dated Jan. 4, 2017, 17 pages.
"Planogram," Wikipedia, https://en.wikipedia.org/w/index.php?title=Planogram&oldid=S19349857, 4 pages.
Office Action issued in European Patent Application No. 13 852 221.4 dated Jul. 12, 2017, 8 pages.
Office Action issued in Japanese Application No. 2015-541827 dated Oct. 24, 2017, 12 pages.
Office Action issued in Japanese Application No. 2015-541927 dated Apr. 10, 2018, 5 pages.
Office Action issued in Korean Patent Application No. 10-2017-7024558 dated Nov. 1, 2018, 19 pages.
Notie of Reasons for Rejection, Japanese Patent Application No. 2018-166635, dated Jun. 16, 2020, 7 pages.

* cited by examiner

Real-world Shelf
(Physically Present Items)
923

Virtual Inventory Items
(Virtual Shelf, Items, Etc.)
921

Device
(Display, Interface, Etc.)
915

VIRTUAL PLANOGRAM MANAGEMENT SYSTEMS AND METHODS

This application is a continuation of U.S. application Ser. No. 15/918,976 filed on Mar. 12, 2018, which is a divisional of U.S. application Ser. No. 15/213,154 filed on Jul. 18, 2016, now U.S. Pat. No. 9,953,288, which a continuation of U.S. application Ser. No. 14/528,852 filed on Oct. 30, 2014, now U.S. Pat. No. 9,536,218, which is a divisional of U.S. application Ser. No. 13/667,988 filed on Nov. 2, 2012, now U.S. Pat. No. 9,336,508, which is a divisional of Ser. No. 13/667,965 filed on Nov. 2, 2012, now U.S. Pat. No. 9,430,752. These and all other extrinsic materials discussed herein are incorporated by reference in their entirety.

FIELD OF THE INVENTION

The field of the invention is virtual planogram management technologies.

BACKGROUND

The number of retailers (e.g., providers of information, goods, services, etc.) has increased over time, leading to the decrease in physical shelf and display space available per retailer. Thus, retailers have struggled on how to maximize the value of physical retail space. Simply put, retail space is very limited, which restricts the number of products a retailer can place in the space.

With the advent of the Internet, physical space is less of a constraint for many retailers because they can present their product via a web interface. For example, retailers can display many products via one or more images on their web site and allow consumers to purchase the corresponding product. Moreover, consumers are able to obtain information, browse or shop for a physical item, with increased convenience and efficiency. Unfortunately, busy consumers require access to such web sites to enjoy the shopping experience. Busy consumers, especially commuters, don't have time to engage such web sites or don't have devices that are capable of securely interacting with the web sets.

Tesco™ is one company that has been quite successful in capitalizing on the idea of selling multiple items to busy consumers through a single photograph. Tesco posts a picture of purchasable groceries in subway stations (e.g., a picture of a Chiquita™ banana that represents all Chiquita™ bananas available through Tesco), along with a QR code associated with the picture, and allows users to purchase the bananas by scanning the QR code via a smart phone. Unfortunately, Tesco only presents static images, a photograph for example, and does not provide for a dynamic representation of available products or product in inventory.

Other companies, such as Poshmark, Inc. and Macy's, have been able to capitalize on the rise of digital or virtual shopping platforms. Poshmark, Inc., for example, developed an iPhone™ application that allows users to buy and sell fashion items from their iPhone™ via "real time shopping events". Macy's and other retailers have attempted to enhance in-store shopping experiences by providing kiosks that allow customers to browse the items of the store they are in via an interactive screen (See "Touch-screens create online shopping experiences at stores," USA Today, by Hadley Malcolm (Feb. 8, 2012)).

U.S. Pat. No. 8,229,800 to Trotman et al. discloses methods for creating a virtual shopping area based on one or more constraints. U.S. Pat. No. 7,657,457 to Razumov, US Patent Publication No. 2008/0208715 to HOD et al., International Publication No. WO 01/37540 to Perkowski, International Publication No. WO 2012/075589 to Abza, and US Patent Publication No. 2009/0149199 to Maghoul, each attempt to utilize digital or virtual space for commercial activity. Unfortunately, these also fail to provide insight into presenting a dynamic, real-time shopping experience for busy consumers.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

However, each of the available platforms, systems and methods fail to maximize the value of virtual marketplaces for retailers and users. Thus, there is still a need for improved apparatuses, systems, and methods for providing interactive virtual marketplaces.

SUMMARY OF THE INVENTION

The inventive subject matter provides apparatus, systems and methods in which a virtual marketplace (i.e., virtual store space) can be presented to users based at least in part on virtual planogram(s) that determine how representations of items should be placed within the marketplace. One aspect of the inventive subject matter comprises an interactive transaction system, such as an Automated Sales Machine (ASM), having a display that presents a virtual item to a user in accordance with a virtual planogram generated by at least one of a planogram manager, planogram server, participating retailer, or management server.

A representation or representations of items (e.g., a virtual inventory item, a real inventory item, a virtual service item, etc.) can be presented in a virtual marketplace on any suitable display. It is contemplated that the display can be configured to render one or more virtual marketplaces, including for example, virtual representations of shelves, malls, stores, windows, racks, revolving racks, hangers, cases, freezers or mannequins, or combinations thereof.

As used herein, the terms "virtual" is used to refer to anything having computer generated imagery (CGI), digital imagery of a real item, video of a real item, augmented reality, virtual reality, mediated reality, or any other electronic representation of objects that are not physically present. A virtual item would include a superimposed image of a real-world product on an image of a real-world scene. For example, a consumer could capture an image of a real-world store shelf having physically present product. The device can superimpose additional products on the real-world store shelf as a virtual item even thought the virtual item represents a purchasable product that is not physically present.

The items themselves can be virtual or real. Thus, a representation of an item can be a virtual representation of a virtual service (e.g., virtual service item), a virtual representation of a virtual inventory item (e.g., video game weapon, video game tool, digital song, digital album, digital music video, etc.), a virtual representation of a real inventory item (e.g., food item, clothing item, or any other purchasable product, etc.), or a virtual representation of a real service item (i.e., a service provided by an actual human). The items can be items offered by any suitable retailer or retailers, including for example, a grocery store, a jewelry store, a clothing store, an informational kiosk, a sales kiosk, a small business run from a home, an individual vendor, or combination thereof.

The planogram used in generating a virtual marketplace can be a static or dynamic in nature. When a display is configured to present a virtual marketplace according to a static planogram, a representation of an item presented by the display will not be deleted, moved, replaced, or otherwise modified by a different representation unless the planogram is modified or replaced. When a display is configured to present a virtual marketplace according to a planogram that is dynamic, at least one representation of an item presented by the display can be deleted, moved, replaced, or otherwise modified by a different representation, even absent a modification or replacement to the planogram.

It is contemplated that a dynamic planogram can be configured to move, delete, replace, or otherwise modify 1, 5, 10, 100, or even 1000 or more representations upon triggering of an event or events. Contemplated events include for example, an item being sold out, a different representation being moved, a vendor's lease of a space expiring, a time change, a temperature change, a seasonal change, or any other event that would cause a retailer to want a deletion, replacement or other modification of a representation. Moreover, a planogram can be substantially or entirely endless in nature, such that a virtual space is configured to present some representation at all times, regardless of the number of events that take place.

From a methods perspective, a display can be configured to present a virtual marketplace having representations of items according to a planogram or planograms, simultaneously or sequentially. A planogram could be generated (e.g., by a planogram manager, display provider, planogram server, and/or a management server, etc.) in a way that maximizes profits for him/her/itself. For example, the representations can be given a placement (i.e., a space) within a planogram based on a fee schedule. The fee schedule could be based upon any suitable logic, including for example, auctions, prices that depends on the placement desired for a representation, prices that depends on a time, weather, or event, prices that depends on the exclusion of a competitor from a virtual marketplace presented by a display, or prices that depends on the ability to choose replacement representations (e.g., where the purchaser can purchase a display or portion thereof, and determine what replacements should be made upon an event).

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a computer/server based planogram management systems, various alternative configurations are also deemed suitable and may employ various hardware-based computing devices including servers, interfaces, systems, databases, agents, peers, engines, controllers, or other types of computing devices operating individually or collectively. One should appreciate the computing devices comprise a hardware processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

One should appreciate that the disclosed techniques provide many advantageous technical effects including for example, providing an interactive transaction system that allows vendors to save costs associated with physical retail spaces and salespersons by utilizing a virtual space efficiently. The contemplated systems generate virtual planogram signals, which can be sent to electronic devices. The virtual planogram signals configure the devices to present purchasable products on a display.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
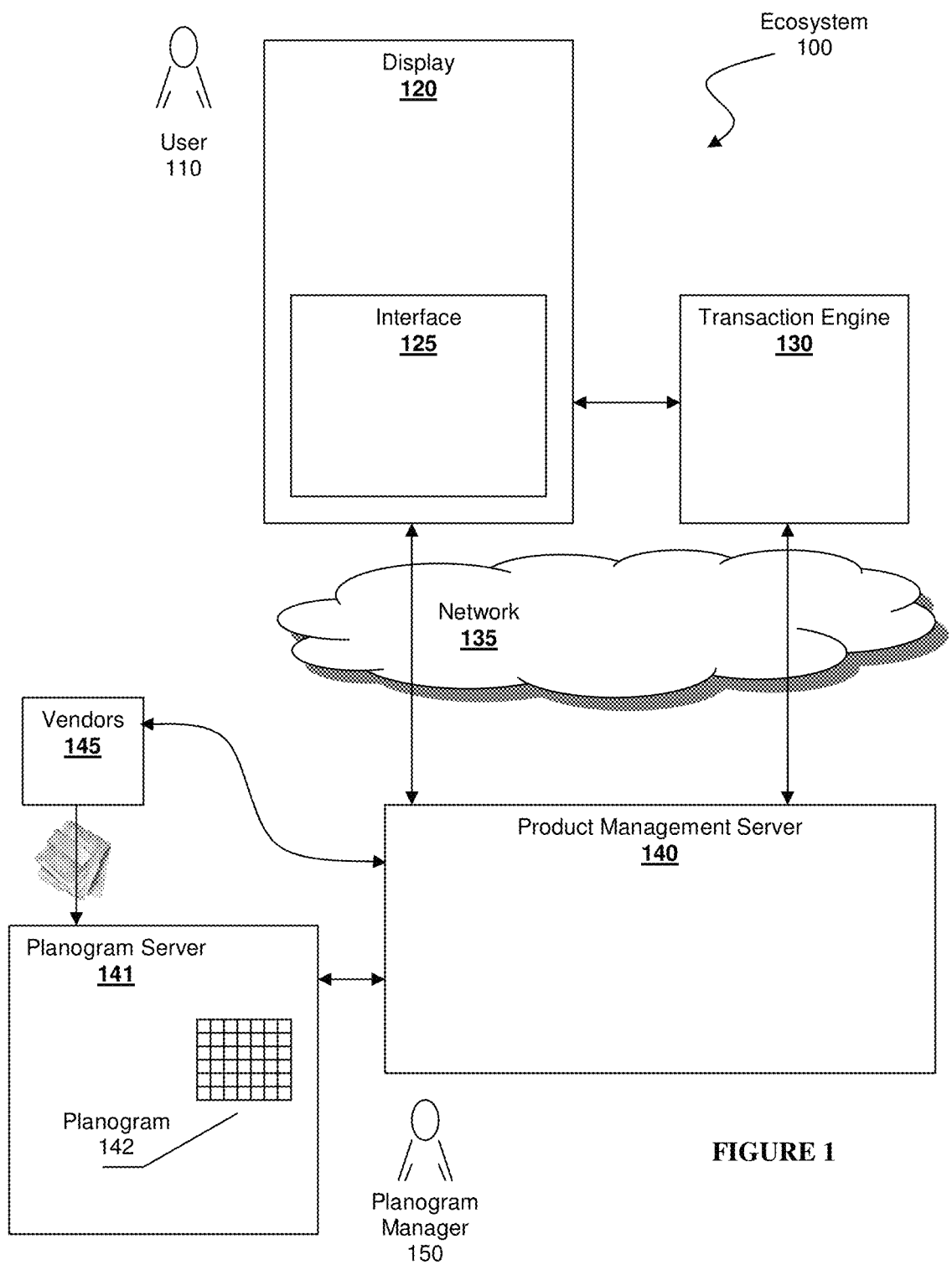
FIG. 1 is a general overview of an interactive transaction system having a planogram.

In FIG. 1, ecosystem 100 represents an interactive transaction system where users 110 can interact with a virtual marketplace via with a display 120 and via interface 125. In ecosystem 100, users 110 are able to purchase products via display 120 even when the products are not physically present at a store or other commercial venue. The products presented on display 120 can be presented according to virtual planogram 142 thus giving rise to a rich shopping experience. One should appreciate that user 110 can interact with the contemplated transaction system from nearly any location including an actual brick and mortar store, a bus station, an airport, a subway station, a mall, at home, or other locations.

Display 120 is configured to present a virtual marketplace(s) to users 110 under instruction from product management server 140. The term "virtual marketplace" is used euphemistically to represent a venue on display 120 through which user 110 can conduct a transaction with respect to one or more items. The virtual marketplace can be digitally represented as an individual product, a collection of products, a section of a shelf, a whole shelf, a display case, a rack, a rotating rack, a freezer, a store, a collection of stores, a mall, a bazaar, or other forms of venues through which items can be purchased.

Display 120 can include a broad spectrum of devices. In some embodiments, display 120 can include wall-mount high density displays (e.g., HD monitors, computer screens, televisions, etc.) that present the virtual market place. In other embodiments, display 120 can be portion of a computing device, for example, display 120 can operate as the display for a smart phone, a tablet computer, a kiosk, a device composing a kiosk, or comprise any other suitable rendering device.

Interface 125 can also take on many different forms. For example, interface 125 can be multimodal touch sensitive display (e.g., display 120, a keyboard, a mouse, or even sensors within the display (e.g., camera, accelerometer, magnetometer, etc.). User 110 uses interface 120 to interact with information presented via display 120.

Display 120 is communicatively coupled to a product management server 140 which provides product information or other item information to display 120. For example, in a store environment or mall environment, product management server 140 can include inventory information. As user 110 interacts with display 120 to purchase products, product management server 140 can instruct display 120 to render corresponding product according to virtual planogram 142. One should appreciate that product management server 140 can provide product information from one or more of vendors 145.

Display 120 is also communicatively coupled to transaction engine 130. Transaction engine 130 can be configured to initiate a transaction based on input received from user 110. Transaction engine 130 can also couple with product management server 140, through which transaction engine 130 can receive salient transaction parameters (e.g., price, quantity, SKU, vendor ID, promotions, account information, security keys, certificates, etc.). When instructed by user 110, transaction engine 130 can initiate a transaction. Example transaction engines can include a point of sales terminal, a local or remote web server, a banking system, or other device configured to interact with display 120. For example, a consumer could interact with display 120 on a tablet computer in a store to identify a purchasable item that might not be physical present. The consumer can then pay for the item at a point of sales device via Near Field Communication (NFC).

In the example show, transaction engine 130 and other components of ecosystem communicate among each other via network 135. Example networks can include the Internet, WAN, LAN, wireless networks, mesh networks, cellular networks, or other forms of communication infrastructure.

Of particular note, display and presentation of purchasable items within display 120 are governed by planogram 142. Virtual planogram 142 is not a traditional planogram representing a physical arrangement of physical products on a shelf. Rather, planogram 142 represents policies or rules that govern placement of virtual items within display 120. Thus, the planogram 142 can be considered virtual in the sense that it defines how purchasable items are to be displayed in a virtual environment as depicted within display 120.

Planogram 142 represents a distinct manageable object that is consider separately manageable from products, goods, services, or items managed by product management server 140. Such an approach is considered advantageous as it allows for planogram 142 to be considered a valuable commodity with respect to product placement as discussed further below.

One or more of planogram 142 can be managed via planogram sever 141. In the example shown, planogram sever 141 illustrated as a separate server that offers its planogram management services as a for fee service. Entities, possibly one or more vendors 145, can pay a fee (e.g., a bid, a subscription, a flat fee, a per use charge, etc.) in exchange for having their products incorporated into planogram 142. Typically, planogram 142 is managed by planogram manager 150. Planogram manager 150 can be an owner, vendor, licensee of the planogram, or other entity that is authorized access to planogram 142.

It is contemplated that a vendor 145 can obtain inclusion in a planogram in various ways. As mentioned, vendor 145 can pay a fee, or vendor 145 can have their wares included in planogram 142 simply by being a retailer in a specific establishment (e.g., a mall). Vendor 145 can also have their goods or services included by filling out a request form, by a request of the retailer's agent or affiliate, or even through a request by a third party.

Figure 2:
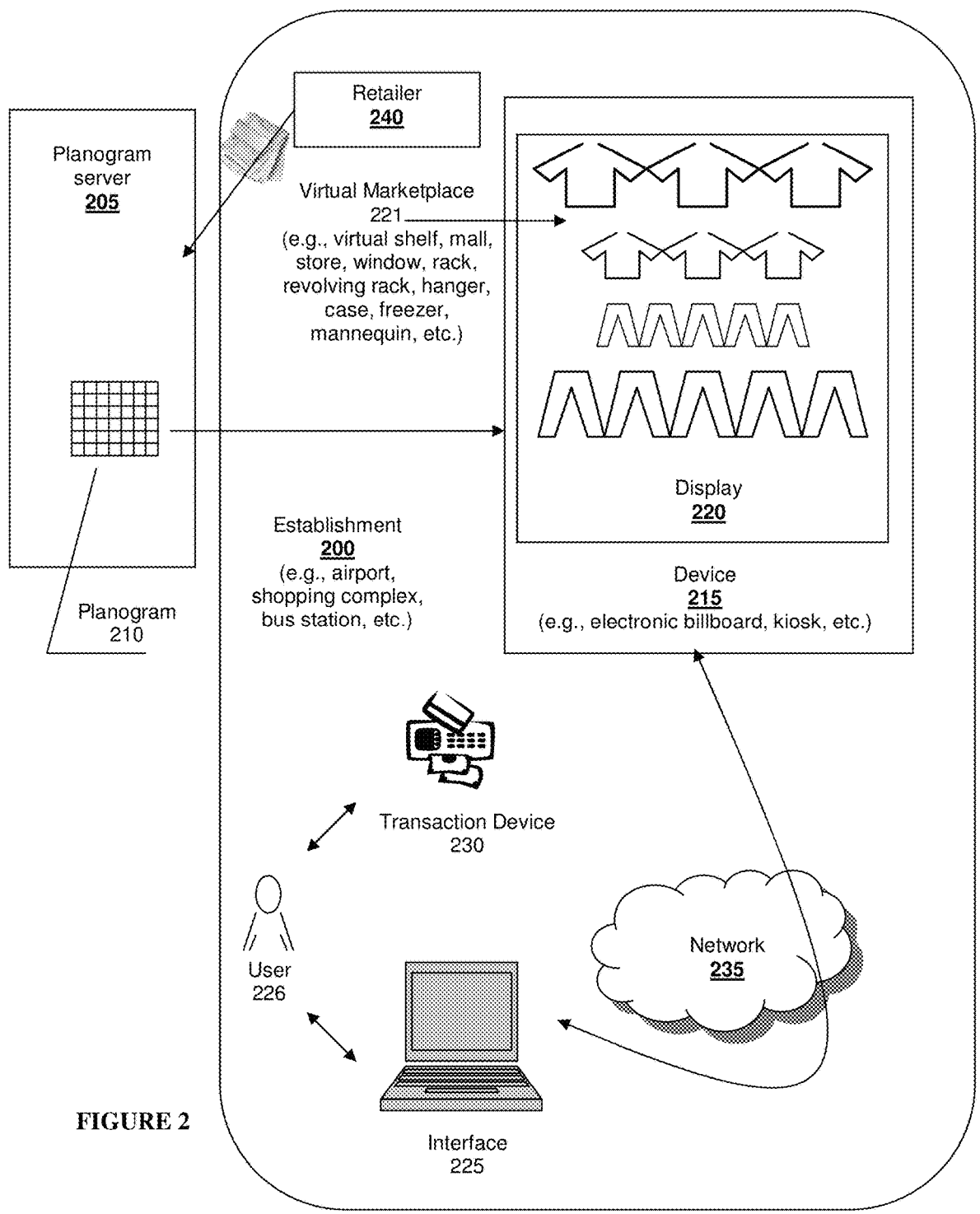
FIG. 2 is a schematic of an interactive transaction system of an establishment.

FIG. 2 illustrated a possible embodiment where an interactive transaction system is integrated within an establishment 200. Contemplated establishments 200 can include: (a) airports, bus stations, train stations, subway stations, taxi stops, or any other transportation hub or public transportation station; (b) indoor malls, outdoor malls, city centers, outlet centers, or any other shopping complex; (c) libraries, museums, amusement parks, or any other publicly accessible establishment; (d) travel agencies, tour guide establishments, or any other business that provides tourism services; and (e) hotels, motels, bed and breakfasts, lodges, cabins, or any other public or semi-public lodging establishment. Thus, the inventive subject matter is considered to include construction or placement of a virtual marketplace within one or more establishments, where the purchasable items are arranged according to the rules within virtual planogram 210.

Establishment 200 can include a device 215 having a display 220 that is configured to present a virtual marketplace 221 to consumers. All commercially suitable devices configured to present data (e.g., electronic data, etc.) to a user are contemplated, including for example, an electronic billboard, kiosk, television, computer screen, tablet computer, and smart phone. For the sake of discussion, establishment 200 can be considered a mall having a plurality of computer monitors (e.g., HD TVs, etc.) operating as display 220. The monitors can be placed on a wall of a mall corridor and form a wall of monitors that display virtual shelves or even virtual stores. Consumers in the mall can interact with the monitors to navigate the stores or even purchase products. Thus, the virtual marketplace 221 created by the monitors and associated planogram 210 can be considered an Automated Sales Machine (ASM).

Display 220 can present virtual marketplace 221 in accordance with planogram 210, which can be generated by planogram server 205. In the mall example, planogram 210 can be a free planogram available to participating retailers 240 of establishment 200, the stores of the mall for example. However, it is also contemplated that planogram 210 can comprise or a for-fee planogram available to retailers 240, or possibly to other vendors. For example, in FIG. 2, retailer 240 (i.e. vendor) is a retailer of the establishment 200. Still, a remote retailer establishment 200 could purchase a slot for product placement within planogram 210, and thereby present their products via virtual marketplace 221. Planograms and management thereof will be discussed in further detail below.

Device 215 can comprise, or be communicatively coupled to (e.g., via network 235 of establishment 200) at least one of interface 225 and transaction device 230. Each of interface 225 and transaction device 230 can be configured to receive at least one of information related to a payment or a user 226, a selection of an item in virtual marketplace 221, or inventory of a retailer. Interface 225 can comprise any suitable interface, including for example, a touch-screen, keyboard, digital keyboard, buttons, digital buttons, speaker, voice receiver, and biometric sensor. Information related to a payment can include any suitable data, including for example, credit card number, expiration date, security code, name, address, login, password, phone number, email address, fingerprint, pin number, or other data that can be used for shopping or conducting a transaction.

Consider a scenario where a virtual marketplace 221 is placed within a public location. One example could include constructing a possible interactive transaction system that can be configured to operate as a branded ASM within an airport terminal. For example, the ASM could be branded as a Trader Joe's™ ASM and be associated with the airport (e.g., provided by the airport, in a space leased by the airport, pay a commission to the airport, etc.). The airport could install one or more of display 220 within a terminal and provide planogram 210 to Trader Joe's. In exchange for a fee, the airport can display available products via display 220 according to the branded planogram. As travelers pass through the terminal, they can interact with display 220 to purchase items from Trader Joe's. The purchased items can be shipped to the user 226 at their home, can be picked up by the user 226 from a near by Trader Joe's on their way home, or can be delivered by a Trader Joe's to an address chosen by user 226. The transaction of purchasing the selected products can be supported by transaction device 230.

One should appreciate that the ASM is not restricted from presenting goods or services from a single retailer 240 or establishment 200. Planogram 210 can include rules or criteria that dictate placement of products based on many factors. Consider the Trader Joe's example again. The ASM can present products according to the planogram 210 where planogram 210 is configured to present actual products available from multiple Trader Joe's™ regardless of their locations. For example, planogram 210 can dynamically construct an arrangement of products from all the different Trader Joe's based on user preferences, perhaps based on a protocol defined by the user. A user protocol can include any preference or information related to a user, including for example, a size preference, a department preference (e.g., having a bakery, deli, etc.), a restriction (e.g., dietary restrictions, allergy, etc.), a brand, a vendor, and a (e.g., a specific address, city, or zip code, a state, a maximum distance from the kiosk or other device, distance from a city, etc.). As examples, when user A enters a first geographic protocol (e.g., the zip code 90028) via an interface, the display can be configured to present representations of items available at the Trader Joe's on Vine street in Hollywood, Calif., a Trader Joe's local to zip code 90028. Renderings of symbols associated with the items (e.g., a specific QR code for a specific brand of chocolate bars, and a different specific QR code for a specific brand of veggie chips, etc.). When user B enters a second different geographic protocol (e.g., the city and state Albuquerque, N. Mex.)), the display can be configured to present an arrangement of products according to planogram 210 from Trader Joe's locations in Albuquerque, N. Mex. Still further, planogram 210 can configure display 220 to present a virtual representation of an actual retailer. For example, if a user 226 enters the zip code 02115 (i.e., Boston, Mass.), the display can be configured to present a virtual replica of the Trader Joe's on Boylston street in Boston. In a circumstance when a store cannot be found to match a user's protocol, geographic or otherwise, a best match can be found. Even where an exact match is available, it is contemplated that second best, third best, or even twentieth or lower best matches can be provided to a user. It is contemplated that user protocols can be entered via an interface of the device, or an interface coupled to but remote to the device. Contemplated interfaces include consumer devices, including keypads, touch-screens, buttons, or any other suitable consumer device.

Another example of a possible interactive system operating as an ASM is an interactive billboard, possibly operating near a duty free shop. Such an embodiment can allow users to select and purchase perfume, lotion, or other items that cannot be taken with them on flights due to TSA regulations. Such an approach allows travelers to obtain the benefit of purchasing tax free goods without requiring them to carry the items on a plane. The interactive billboard (i.e., display 220 and device 215) can present representations (e.g., images, video, drawings, names, digital models, etc.) of duty free items available to shoppers flying to a foreign country. Each representation can be associated with a unique rendered symbol. A shopper can then select certain items by capturing a digital representation of the rendered symbol via a user device (e.g., a camera enabled cellular phone, tablet computer, etc.). When the user wishes to checkout, the user can present a qualifying boarding pass or other verification document to the interactive billboard via a verification engine or transaction device (e.g., a barcode or QR code reader of the billboard or user device, etc.). If the transaction device or verification engine determines that the user in fact qualifies as a duty-free shopper (i.e., is a qualified user), the user can automatically have her items ready for pickup at the user's destination terminal or other destination address (e.g., 10, 100, 1000, or even 10,000 miles or more away from the interactive billboard).

Another example of an interactive system that can be provided in establishment 200 is a kiosk that can allow users to select a participating retailer 240 to shop with, including for example, Tiffany's™, Na Hoku™, Conroys™, and See's™. A traveler flying from San Francisco to Los Angeles can purchase items, via the kiosk, at the Los Angeles airport. The passenger can be given the option to either pick up the item at the retailer's store or have the item delivered to an address. The kiosk can be configured to print a 3-D version of the item selected as discussed with respect to FIG. 3, or the kiosk can store miniature versions of the items selected (e.g., in a storage compartment of the kiosk) to be made available to purchasers. Thus, one could order a money clip from Tiffany's to be picked up at a nearby store or other location (e.g., within 10, 50, 100, or 200 feet of the kiosk) selected by the consumer, as well as obtain a miniature version made of the same of different material (e.g., paper, plastic, etc.), via the kiosk's 3D printer or storage compartment. One can then give the dispensed version as a proxy to show the recipient what was purchased.

Virtual marketplace 221 presents one or more representations of items according to planogram 210. The type or format of each representation can be determined by retailer 240, planogram server 205, planogram manager, a third party, or other entity assuming proper authorization. The representation can be or comprise an image, a digital model, a series of non-moving images, motion imagery, a video stream, text, a combination thereof, or any other suitable representation of an item.

Planogram 210 is rendered via planogram sever 205 and can be presented to the planogram manager according to various formats. For example, the planogram manager can access planogram sever 205 via a browser interface in embodiments where planogram sever 205 comprises a web server (i.e., an HTTP server). Planogram sever 205 can render the planogram 210 for the planogram manager using different techniques. In some embodiments, planogram 210 can be rendered graphically allowing the manager to drag and drop product representations into available planogram slots. In other embodiment, planogram 210 can be presented in a tabular form with corresponding text (e.g., SKUs, GUIDs, retailer information, etc.) or images. Still, in other embodiments, planogram 210 can render as a computer model or simulation illustrating a 2D, 3D, 4D (i.e., temporal aspects), or higher dimensional representations of the planogram in the environment of establishment 200.

As an example consider a scenario where a planogram manager wishes to instantiate planogram 210 with respect to toys. The planogram manager might be the toy manufacturer or distributor who wishes to increase exposure of their toy line when shelf space is limited. The planogram manager can purchase access to planogram 210. In response, planogram sever 205 provides a planogram template in the form of a 3D modeled shelf as it would appear to a user via display 220. The manager could place virtual 3D rendered models of their toys (e.g., dolls, cars, trucks, games, etc.) on to the shelves. Planogram server 205 can, in real-time, model the physics of the shelf assuming such a feature is desirable to the manager. Once the manager achieves a desired configuration of toys, the manager can instantiate planogram 210 causing the planogram sever 205 to make the representations of the toys appear within virtual marketplace 221 on display 220. User 226 can then purchase or order the toys through interactions with display 220.

User 226 can purchase or otherwise interact with the products managed by planogram 220 in a number of different ways. In some embodiments, display 220 can include a touch sensitive display. User 226 can initiate a purchase of an item by touching the representation of the item, or some other portion on the display associated with the item. Additional input regarding the purchase can be made by the user through transaction device 230 or interface 225. In other embodiments, user 226 can use interface 225 to indirectly initiate a transaction. For example, user 226 can use a camera on their smart phone (i.e., interface 225) to capture an image of virtual marketplace 221. The cell phone or other platform can analyze the image and recognize products on display 220 as purchasable objects. The camera can then interact with transaction device 230 or even device 215 over network 235 to initiate the transaction. Acceptable techniques for recognizing objects and initiating transactions are describe in U.S. Pat. Nos. 7,016,532; 7,899,243; 7,881,529; and 7,899,252. Once user 226 completes a selection of items, the user can be presented with advertisements, payment options, and pickup/delivery options.

It is contemplated that the "advertisements" can include suggestions for products the user may be interested in, coupons for products, or any other type of advertisement. The advertisements presented to users can be based on consumer selections, other information related to the user, random selection, payments made by advertisers, a virtual planogram 210 (e.g., space within the planogram is associated with different advertisements to be presented to users), or other factors. Payment options can include the option to enter at least one of a credit card number, payment amount, form of payment, authentication or authorization information (e.g., login name, password, security keys or tokens, etc.), address, or other information in support of the transaction.

Figure 3:
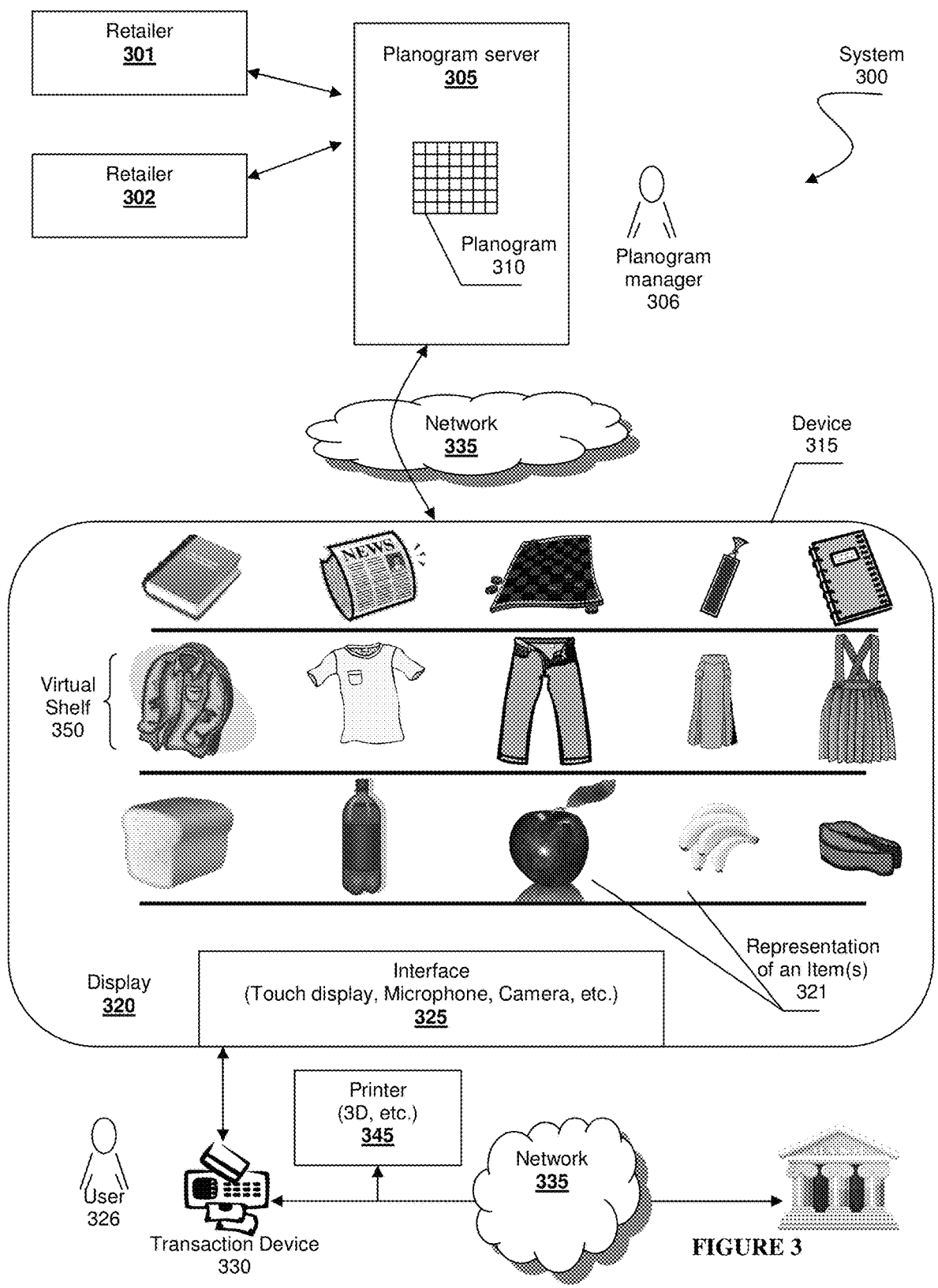
FIG. 3 is a schematic of another interactive transaction system.

FIG. 3 is a schematic of an interactive transaction system illustrating an embodiment where the virtual marketplace comprises a visual display of an interactive virtual shelf. In the example shown, system 300 comprises multiple different retailers 301 and 302 who obtain product placement within planogram 310. For example, a planogram manager 306 constructs planogram 310 via a manager interface offered by planogram server 305. One should appreciate that planogram manager 306 could, in fact, be one of retailers 301 or 302. However, it is also possible planogram manger 306 could be a third party (e.g., owner of a venue, planogram owner, etc.). Once planogram 310 is instantiated, retailers 301 or 302 can engage with planogram sever 305 to ensure their products are integrated into planogram 301. In the example shown, planogram server 305 is communicatively coupled with device 315 via network 335. Device 315 comprises a display 320 configured to present virtual shelves 350 to user 326. Virtual shelf 350 comprises various representations of items 321. User 326 can select a representation, or an item, via display interface 325.

The embodiment presented in FIG. 3 allows user 326 to interact with one or more virtual shelf 350 via device 315 to purchase one or more items. For example, user 326 can utilize a smart phone that constructs virtual shelves 350 according to planogram 310. Virtual shelves 350 comprise a virtual representation or model of a store shelf displaying one or more representations of an item 321 according to planogram 310. One should note that virtual shelf 350 can include products from one or more of retailers 301, 302, or other retailers. In some embodiment virtual shelf 350 can reflect actual inventory of retailers 301 or 302, or even an actual shelf in the establishments of the retailers. Regardless of the form taken by virtual shelf 350, user 326 can interact with the shelves in a virtual fashion.

User 326 has numerous possible points of interactions with virtual shelf 350 via interface 325. For example, user 326 can browse across shelf 350, pan device 315 across shelf 350, select or zoom into items 321, or otherwise shop for items 321 as permitted by planogram 310. One should appreciate that virtual shelves 350 could be represented as being larger than the field of view permitted by display 320. In such scenarios, panning device 315 (e.g., moving device left, right, up, down, etc.) allows user 326 to observer other portions of shelves 350. This can be achieved through monitoring sensor data from device 315. In some embodiments, accelerometer or magnetometer data can be used to derive a position or orientation of device 315 through properly integrating the sensor data. Additionally, device 315 can leverage Visual Simultaneous Localization and Mapping (vSLAM™; Karsson et al. "The vSLAM Algorithm for Robust Localization and Mapping", Proc. of Int. Conf. on Robotics and Automation (IRCA) 2005) technology to determine position or orientation of device 315. When desire, user 326 can initiate a transaction associated with one or more of items 321 via transaction device 330, possibly a financial transaction with a bank as illustrated.

In some embodiments, system 300 can include 3D printer 345. Once a suitable transaction is complete for an item 321, user 326 could possible download a file comprising instructions or code for 3D printer 345 that defines a rendering of selected item 321. For example, the file could be in STL, VRML, or WRL file formats describing the 3D nature of the selected object. One should appreciate that printed object could be the item actually purchased, or could be a proxy item made available to user 326 until the actual product arrives. Such an approach is considered advantageous in embodiments where user 326 requires immediate access to an item or wishes to have instant gratification; perhaps item 321 is a toy that requires shipping but the proxy object can be played with immediately. All commercially suitable three dimensional printers are contemplated, including for example, printers made by Solidoodle, 3D Systems (e.g., ProJet 1500, Cube 3D, RapMan, etc.), PP3DP Company, LeapFrog (e.g., Creatr, Xeed, etc.), Bits from Bytes, Ultimaking Ltd., MaukCC, MakerBot Industries, Magicfirm LLC, FormLabs, Asiga (Freeform Pico, Pico Plus, etc.), or Stratasys. 3D printer 345 can be configured to print three dimensional items or samples of an item (e.g. a miniature version, less expensive version to try on for size, etc.).

Transaction device 330 allows user 326 to enter information related to at least one of a payment or a user selection. In some embodiments, users can additionally or alternatively enter information related to a payment via consumer interface 325. Transaction device 330 and/or interface 325 will then communicate with a bank or other financial institution via network 335, to initiate a transaction (e.g., an order, purchase, authorization, verification, etc.) associated with a consumer selection through one or more protocols (e.g., FIX protocol, Secure Electronic Transaction, RFC 1898, etc.).

Figure 4:
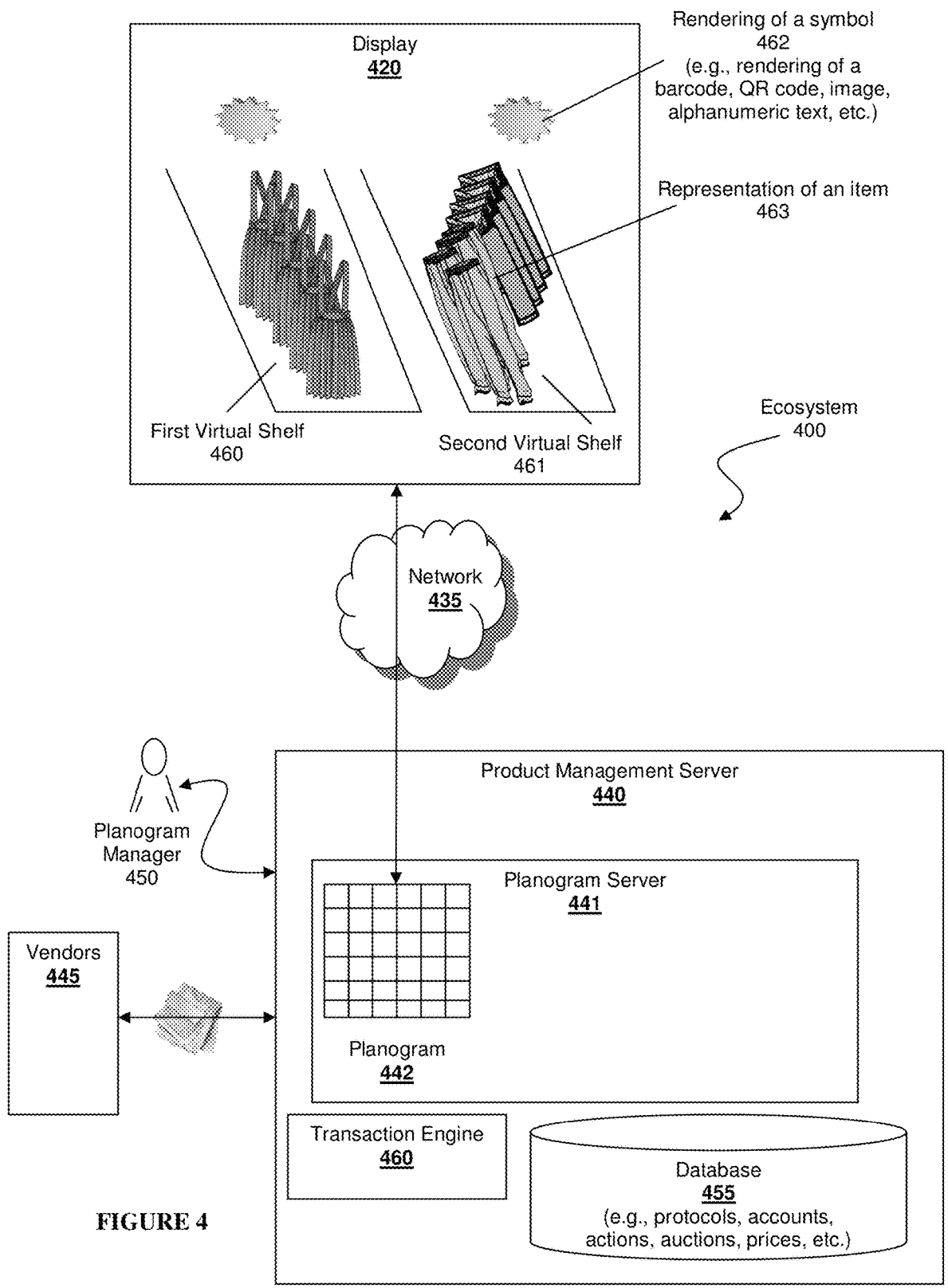
FIG. 4 is a general overview of a virtual display having a shelf having representations of items and corresponding symbols.

In FIG. 4, ecosystem 400 represents a transaction system providing additional insight into management of virtual shelves 460 and 461 in a virtual marketplace as rendered on display 420. Further, in the embodiment illustrated, aspects of ecosystem 400 are combined. For example, planogram sever 441, transaction engine 460, and database 455 are integrated into single product management server 440. Such approaches are advantageous in scenarios where an establishment, a mall for example, wishes to retain control over ecosystem 400. One or more of vendors 445 can interact with planogram 442 via a vendor interface (not shown). Planogram manager 450 manages planogram 442 via a manager interface (also not shown).

Database 455 can be configured to store one or more data objects related to ecosystem 400. More specifically, database 455 can store planogram objects, associated product information, account information (e.g., vendor accounts, consumer accounts, planogram manager accounts, etc.), prices, auction information, or other types of objects.

As previously discussed, planogram 442 determines which representations of items 463 are presented and according to what arrangement within display 420. In this example, display 420 presents two virtual shelves 460 and 461 similar in nature to that described in FIG. 4 with the addition of symbol 462. Planogram 442 can include instructions that configure display 420 to render one or more symbol 462. Symbol 462 can be used to aid in determining the identity of items 463. For example, symbol 462 can be used to identify one or more vendors 445, a specific shelf, a product, a product model, an establishment, a location of information, or other indicia. For example, planogram 442 could instruct display 420 to present a QR code that specifically includes a SKU for item 463 and a URL pointed to transaction engine 460. In such cases, a user can leverage a QR code reader on their camera-enabled cell phone to initiate a transaction with respect to one or more of item 463.

One should appreciate that symbol 462 is considered an electronic or digitally displayed symbol rather than a symbol on printed media. Thus, symbol 462 can change subject to conditions dictated by planogram 442. Example symbols can include bar codes, matrix codes, alphanumeric codes, text, logos, watermarks, or other. Further, symbols 462 can include non-visual symbols possibly including NFC, dynamically changing RFID tags, audio signatures (e.g., audible or non-audible, etc.), or other forms of indicia.

Figure 5:
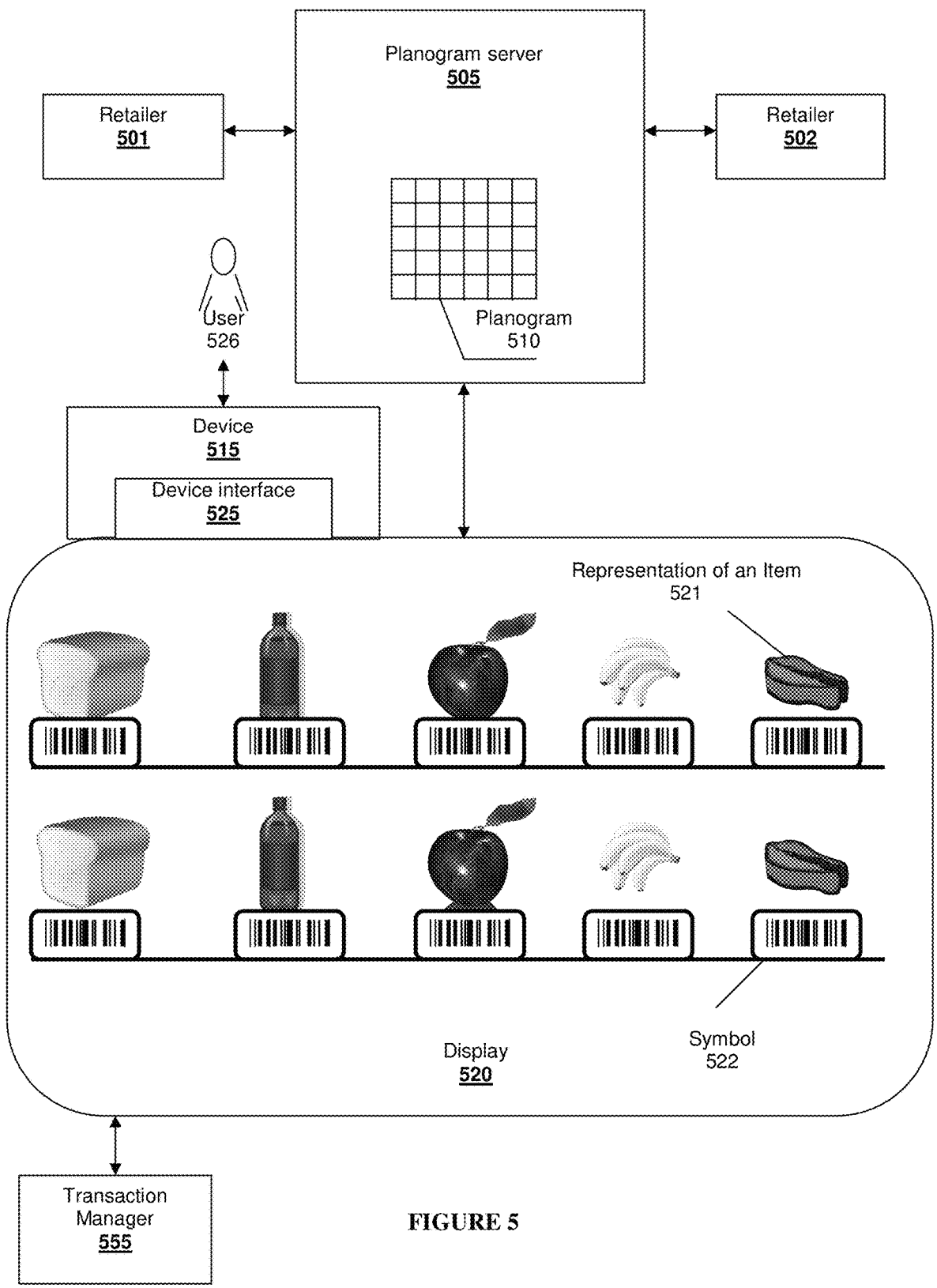
FIG. 5 is a schematic of a virtual display having a virtual shelf.

FIG. 5 represents an environment where a virtual marketplace is constructed according to planogram 510, which is instantiated by planogram server 505. In this example, representations of items 521 include products form multiple retailers 501, 502, or others and are presented via display 520 per instructions defined within planogram 510. Each item 521 includes a symbol 522 (e.g., bar codes, matrix 2D bar codes, stacked bar codes, high capacity color bar codes, data glyphs, QR codes, maxicodes, etc.) so that each item 521 can be easily identified. User 526 interacts with display 520 and with items 521 via a sensor enabled device 515 and device interface 525. For example, user 526 can enter at least one of a selection of an item, a selection of a representation, a selection of a symbol, a quantity, a size, a price, a range thereof, a delivery address, or other information related to a transaction. Device 515 or display 520 can then present a question, response, confirmation, or any other suitable reply to user 526 to initiate or complete the transaction.

In the embodiment shown, the virtual marketplace is communicatively coupled with transaction manager 555 configured to aid in completing a transaction. For example, transaction manager 555 can be configured to verify payment, confirm payment, initiate delivery to a location (e.g., 30, 200, 1000, or even more miles away from the transaction device, etc.), or other actions that aid in completing a transaction. An acceptable system capable providing such services include Amazon™ or Paypal™.

One example of a transaction system that could leverage use of symbols 522 includes an electronic billboard of a train station or other establishment. The electronic billboard can be configured to present a video representation of purchasable products of a grocery store or multiple grocery stores, along with QR codes or other symbols corresponding with the purchasable products, on different virtual shelves/marketplaces. In other embodiments, the display can present still image representations of items 521, which can be updated on a periodic basis, for example, possibly every one, five, or ten minutes as governed by planogram 510. Each shelf could be presented according to the same or different planogram 510. For example, each shelf could be governed by a different instance of the same planogram 510. It is contemplated that a video representation of items 521 can be a live video stream of the products as they are presented in the physical grocery store. Alternatively, the video representations can be pre-recorded or computer generated. It is also contemplated that the virtual marketplace can be navigable such that the user can determine what shelf to view, what portion of a marketplace to view, what representations to view, or section of a shelf to view. A user awaiting a train can thus navigate through a virtual marketplace by interacting directly with interactive display 520 of the billboard, and order, reserve, purchase, obtain information related to or even comment on an item represented. To initiate any of these transactions, the user can simply capture an image of the QR code or other symbol via their camera enabled phone. This approach is considered advantageous because consumers can interact directly with the billboard for an immersive shopping experience while ensuring transactions remain secure through their personal device. Once items have been selected, the user can enter payment and delivery information via one or more interfaces and transaction devices, and have the items delivered to their home before they get there.

One should appreciate that symbols 522 can represent actual inventoried products located at retailer 501 or 502 physical location. In such cases, the system can allow retailers to present inventory items to consumers without having to occupy large amounts of physical space. Rather, the items 521 can be stored in an inventory holding room where presentation is not as important, and space is more readily available. It is contemplated that each display can have a fingerprint or other biometric sensor that allows a user to be authenticated or identified by pressing their finger against the sensor. Once the user is authenticated or identified, the user can use a touch-pad or other interface of a device to select items for purchase. Once the user pays for the items, an employee of the physical marketplace can gather the selected items, package them, and send them with the user before they leave the physical marketplace. Again, the user can capture sensor data representing symbol 522 to initiate a transaction.

Yet another embodiment includes a kiosk having virtual navigation capabilities within a mall. For example, the kiosk can be configured to display a navigable representation of a shopping complex or portion thereof. Retailers within the mall can pay a fee to reserve a space for their products within a virtual marketplace governed by planogram 510. The virtual marketplace can comprise virtual representations of the physical mall in digital model (e.g., 3-D) format, but be limited to representations associated with participating retailers, while non-participating retailers are shown as a blank space, 2-D format, or other suitable differentiating representation. With the display being navigable, it is contemplated that the user can select a preferred view he wishes to have of the mall. For example, the user can select a view showing an avatar representing a user walk through different portions of the virtual marketplace, entering and exiting various wings of the mall, and various stores. Alternatively or additionally, the user can select a view that allows a user to view portions of the mall as if they were actually in that space. Thus, the user can navigate the virtual marketplace and feel as though they are actually walking around the physical mall.

When the user enters a representation of a store via the virtual marketplace, the user can browse and select items to purchase as they would be displayed in display 520 according to planogram 510. Each item 521 can represent an actual item in the corresponding store of retailer 501 or 502. If the user wants to feel a fabric, see what the item would look like on them, or have any other physical experience with the item, it is contemplated that the kiosk can comprise at least one of a 3-D printer that is configured to print versions of the items (e.g., plastic or metal samples), a vending machine configured to dispose samples to users upon request (e.g., lipstick samples, fabric swatches, perfume samples, etc.), and a device that scans an outer perimeter of a user, determines what sizes are most appropriate for that user and allows the user to see what an item would look like on them. Additional information regarding 3-D printing can be found in "Yes, the future of retail is upon us," by Jon Swartz, USA Today (Aug. 9, 2012). The user can interact with a management server and transaction engine to initiate a transaction related to a representation of an item selected. This interaction can occur over a network of the establishment, or any other suitable network.

Motels, hotels, and other lodging establishments can provide displays to guests that allow them to purchase items from remote retailers selling various classes of goods. For example, a display can be configured to present representations of items from one retailer dealing with one class of goods or services, and representations of items from a different retailer dealing with a different class or classes of goods or services, including for example, grocers, jewelry stores, consumer electronics retailers, ticket (e.g., movie, concert, play, etc.) vendors, tourist services vendors, massage service providers, and so forth. As used herein, a "class" is a category of items having some attribute in common and differentiated from others by kind, type, or quality. Contemplated classes include generic product classes, including for example, aspirin, paper towels, sugar, and so forth. It is contemplated that any suitable classification scheme can be used to determine a class, including for example, the International Classification of Goods and Services associated with the United States Patent and Trademark Office, the ISIC classification scheme, and schemes based on brand names, types of products, or names of products. Providing this type of display to guests can attract them to the lodging establishment because of the increase in convenience.

It is contemplated that different retailers of a planogram or virtual marketplace can deal with the same or different classes of goods. It is also contemplated that the retailers can deal with the same class of goods when one scheme applies (e.g., brand), and different classes of goods when another scheme applies (e.g., type of product). Moreover, the retailers can deal with the same class of goods even when two or more schemes apply (e.g., brand, type of product, etc.).

The display(s) provided by the lodging establishment can be configured to present virtual representations of various shelves, each one comprising virtual representations of real inventory items according to different planograms. For example, a first shelf can be provided in accordance with a first planogram and comprise representations of Whole Food's™ real inventory items (e.g., vitamins, etc.), while a second shelf can be provided in accordance with a second planogram and comprise representations of Target's™ real inventory items (e.g., clothing, etc.). Moreover, a first rotating rack can be provided in accordance with a third planogram and comprise representations of Nordstrom's™ real inventory items, while a third shelf can be provided in accordance with a fourth box and text planogram and comprise representations of services made available by Burke Williams™. The retailers participating in a virtual marketplace can be, but do not need to be, located in close proximity to one another, or even deal in the same classes or brands of goods and services. Thus, the Whole Food's can be located in Brooklyn, N.Y., while the Burke Williams is in Silverlake, Calif.

Figure 6:
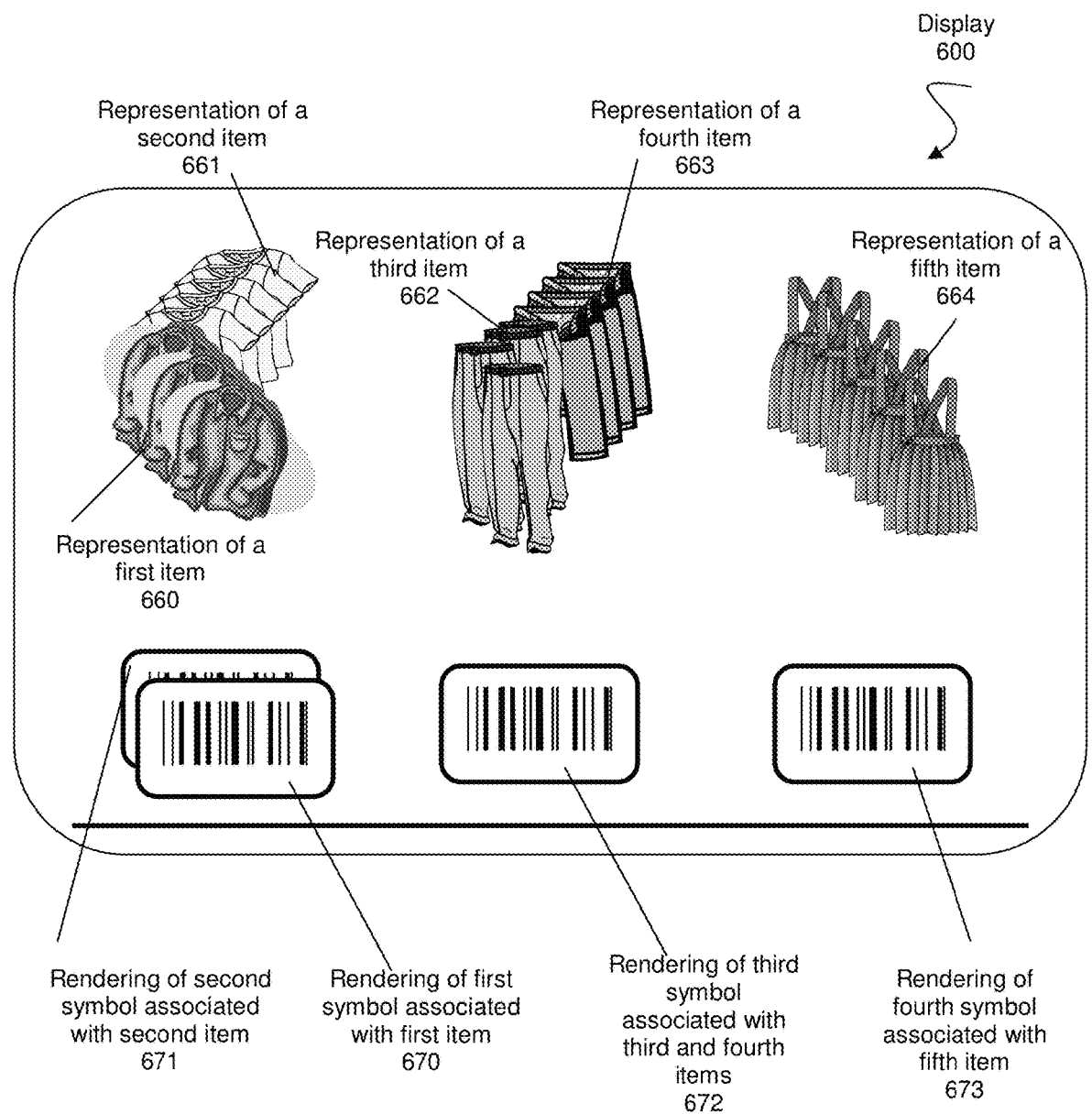
FIG. 6 is a schematic of another virtual display having a virtual shelf.

FIG. 6 illustrates the varied nature of how items can be represented in display 600 according to dynamic planograms where a dynamic planogram is considered to be a planogram capable of changing with time or changing based on triggering conditions (e.g., news events, user preferences, retailers, etc.). Display 600 comprises a virtual shelf having three columns. The first column presents a representation of a first item 660 and a second item 661, having corresponding renderings of first and second symbols, 670 and 671, respectively. The first column illustrates that a planogram can govern which products are placed relative to another product or products. In this case, the consumer sees item 660 placed on the shelf in front of item 661. Similarly symbol 670 appears in front of symbol 671. One should appreciate that items 661 might not necessarily be visible to a consumer until all items 660 have been purchased. Such an approach is considered useful to create value within the planogram or possibly to allow a vendor to virtually rotate stock. For example, item 660 could represent older stock where symbol 670 represents the SKU for the other stock item.

The second column comprises a representation of a third item 662 and a fourth item 663, along with a rendering of a third symbol 672 that is associated with both the third and fourth items. The user can be presented with only a representation of a third item 662 until the item runs our or is otherwise not available, at which point the representation of a fourth item 663 can be presented to a user. Additionally or alternatively, representation of a third item 662 can be presented to a user wishing to order the item in a size 6. If that size is not available, the user can then be presented with a representation of a fourth item 663 different from third item 662, which is available in a size 6. The third column comprises a representation of a fifth item 664, and a corresponding rendering of a fourth symbol 673 associated with the fifth item.

A static or dynamic planogram that can be used to generate a virtual marketplace can be based on a template planogram, possibly where the template corresponds to a real planogram used in an actual store to present product displays on fixtures (e.g., shelves, malls, stores, windows, racks, revolving racks, hangers, cases, freezers or mannequins, or combinations thereof, etc.). Thus, a virtual marketplace can be configured to display the items that are present in a physical marketplace, and update according to the changes made in the physical marketplace. For example, the planogram can represent a physical freezer in a grocery store that has, from left to right, 5 CPK™ frozen pizzas, 3 Hot Pockets™, and 7 Marie Calendars™ chicken pot pies. A dynamic planogram can be used to generate a corresponding virtual freezer on display 600 available inside a grocery store, or remote to, the grocery store. This virtual freezer would comprise, from left to right, representations of 5 CPK™ frozen pizzas, 3 Hot Pockets™, and 7 Marie Calendars™ chicken pot pies. If a frozen pizza is removed from the physical freezer (e.g., for purchase by a shopper, relocation, etc.), the frozen pizza can be removed from the virtual freezer in real-time or substantially real-time. If the planogram used to display items in the freezer is configured to instruct the replacement of the frozen pizza with a strawberry fruit bar, the dynamic planogram used to generate the virtual freezer can configure the display to present a representation of a strawberry fruit bar in place of the frozen pizza, also in real time or substantially real-time.

Figure 7:
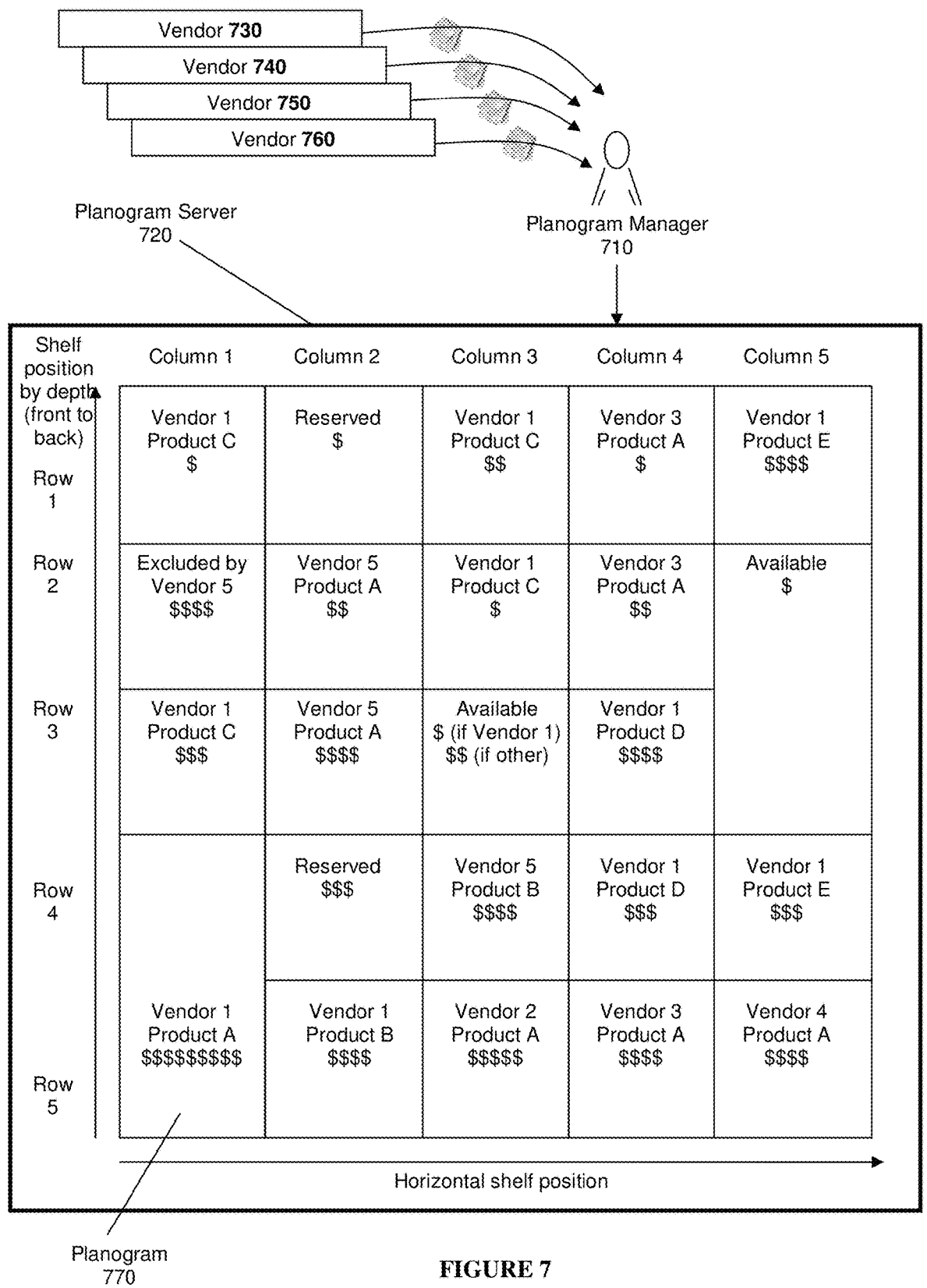
FIG. 7 is a schematic of a virtual planogram.

FIG. 7 illustrates construction of virtual planogram 770. Planogram manager 710 interacts with planogram sever 720 to create, update, instantiate, or otherwise manage virtual planogram 770. Planogram server 720 generates a planogram 770 in accordance with information provided by planogram manager 710, possibly based on input provided by vendors 730, 740, 750, 760, or others. It is contemplated that planogram manager 710 establishes the nature of planogram 770 including its capacity, arrangement, pricing, or other attributes. For example, planogram manager 710 could include a virtual representation of a mall and could create planogram 770 to function as a part of an ASM for the mall, which offers products physically available at the mall's many retailers. The retailers can then pay for slots within planogram 770. Information used to create planogram 770 can include rules governing absolute or relative placement of products in slots, rules governing planogram behavior based on triggering criteria (e.g., events, user indent, inventory, time, location, etc.), conditional rules (e.g., if-then-else, logical operators, etc.), or other rules.

It is contemplated that planogram 770 can be n-dimensional (for physical and logical dimensions), and thus representations of items can be placed within a position of a virtual marketplace according to one, two, ten, fifty, or even a hundred or more of the following: a time, a location, a news event, a temperature, a fee, a trend, a weather condition, a prior purchase, a user preference, a category, or any other event or condition. In the example shown, planogram is euphemistically presented as a 2D planogram of a shelf divided into horizontal slots and shelf depths. However, one should appreciate that planogram 770 can have many "physical" dimensions (e.g., shelf position, position within shelf, angle a representation is placed within a shelf, etc.) or many logical dimension (e.g., time, trends, event, demographics, etc.). Thus slots within planogram 770 can be characterized according to some or all of the dimensions and priced accordingly, possibly based on different weights. Vendors 730, 740, 750, and 760 can each purchase slots within planogram 770 by paying a fee to planogram manager 710 or the service operating planogram sever 720. The fee required for placement can depend on one or more factors, including for example, a prior purchase of slots, desirability of a slot, a time of purchase, popularity of a slot, dynamic nature of a slot, physical dimension, logical dimension, size of a slot, exclusion of others from a slot, slots, or planogram, a continuous presence of a representation despite a user or other protocol dictating otherwise, or any other suitable factor. For example, a for-fee planogram can comprise a product placement policy based on a fee schedule.

As shown in FIG. 7, dollar symbols represent a cost for a slot, where a single dollar sign represents a low cost, and more dollar signs represent higher and higher costs. Column one rows four and five show a virtual marketplace slot that is twice as large as the standard slot. Thus, Vendor 1 can place double the number of representations or items in this slot as Vendor 1 could in an adjacent slot.

First column, second row shows a slot that has been excluded by Vendor 5. This means that Vendor 5 paid a fee to have no items presented next to its product A (Column two, row two). Column five, row two shows a slot that is available for purchase at a low price. This slot is twice as large as the standard virtual marketplace space but available at a lower price than some smaller slots, perhaps due to its location on the right side of the shelf, its proximity to another product or vendor, having been available for a long period of time, or some other factor.

The slot in column three, row three is also available, but at different costs depending on what vendor purchases the slot. If vendor 1 purchases the slot, it will be cheaper, perhaps because Vendor 1 has already purchased so many of the slots within the virtual marketplace.

Each slot within a planogram 770 can be sold for any suitable period of time. Thus, a slot can be sold on an hourly or daily basis, or can even be sold for months or years at a time. It is also contemplated that management options for a slot or slots within a virtual marketplace can be sold. For example, a vendor or group of vendors can purchase column one, row four of a planogram 770 for a one year period for $10,000 USD. This purchase can come with an option for direct management of the slot for an additional $1,000 USD. This can allow a vendor to manage the slot within the planogram possibly as a proxy for planogram manager 710. This would allow the vendor to perform various actions and customize a slot, including for example, including multiple representations within the slot, changing the representation at their whim, deleting a representation (e.g., as inventory decreases, to create a buzz, etc.), placing an advertisement within the slot, selling advertising space within the slot, and choosing the format of the representation (e.g., still imagery, motion imagery, blinking imagery, sound, a combination thereof, etc.).

It is contemplated that each "slot" within a virtual marketplace as governed by planogram 770 can be configured to present at least one of a single representation, multiple representations, or even a virtual marketplace (e.g., rotating rack that is rotatable via touch-screen, button, etc., shelf, etc.) within the virtual marketplace.

Figure 8:
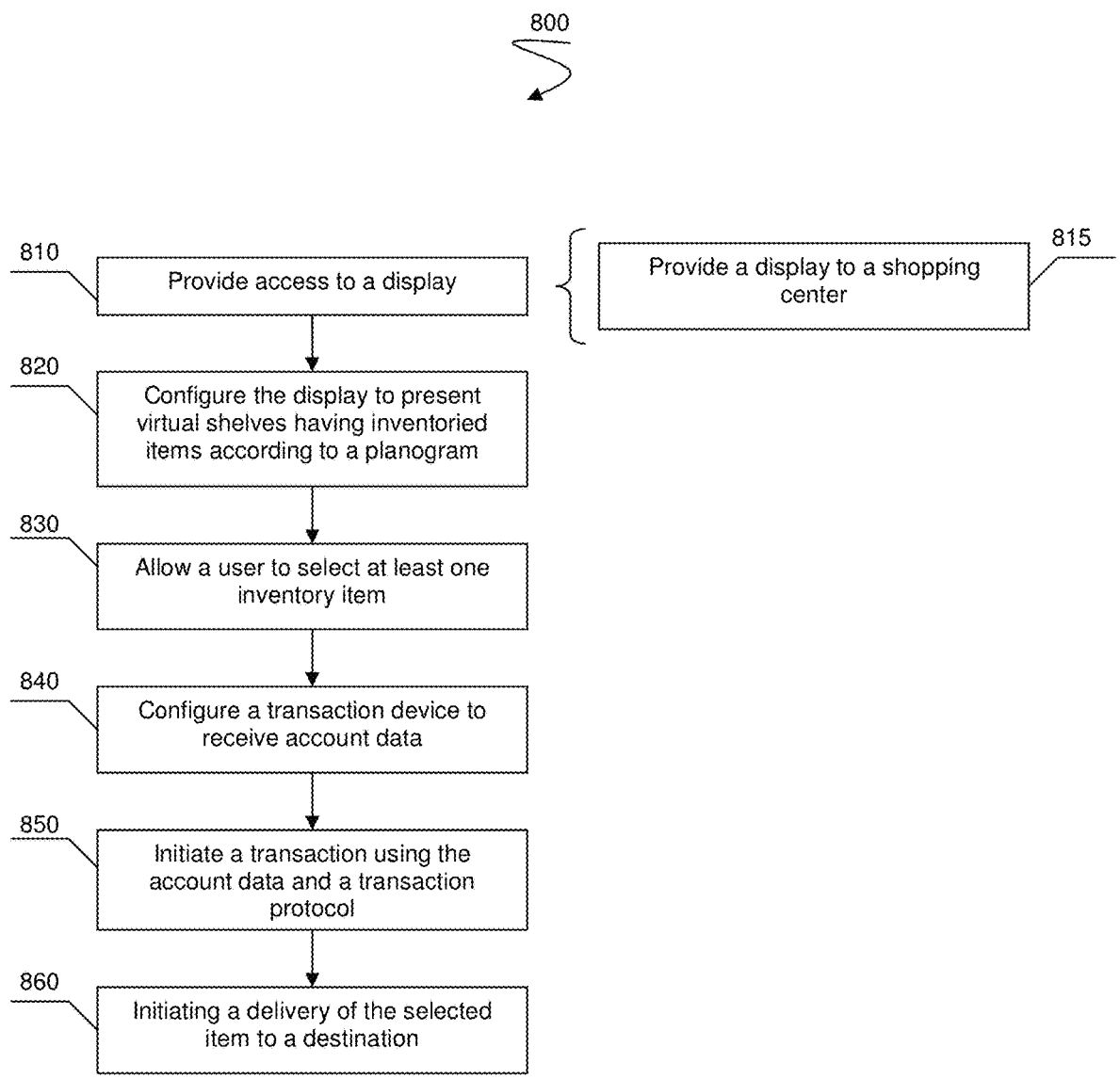
FIG. 8 is a schematic of a method of initiating a transaction via a virtual shopping experience.

In FIG. 8, method 800 illustrates a method of initiating a transaction via a virtual shopping experience. Method 800 include step 810 of providing access to a display (e.g., a computer controllable display, etc.). Providing access to a display can take on many different forms depending on the nature of the desired shopping experience. In some embodiments, the display can be installed as electronic bulletin boards within an establishment, a mall in a pre-operational stage, or existing shopping center as suggested by step 815 for example. In other embodiments the display could include a hand held device display. It should be appreciated that providing access to a display could also include allowing consumers to install an application on their smart devices so that the display can be configured via a planogram server as discussed above.

Step 820 can include configuring the display, possibly via a planogram server, to present a first virtual shelf comprising first and second virtual inventory items according to a planogram. The virtual inventory items are considered to include available items for purchase. Such items do not necessarily have to be physically present with the user or the display. For example, a planogram manager can access the planogram sever to construct or otherwise manage the planogram via a planogram management interface (e.g., browser, API, HTTP server, etc.). As discussed above, the planogram represents a virtual data construct or object that dictates how items are to be displayed according to one or more rules or factors. Example factors that can be used to govern an arrangement of the items can include relative positions, absolute positions, location, user preferences, vendor preferences, establishment attributes, augmented or virtual reality elements, time, events, or other factors. For example, the planogram can include rules that govern placement of virtual items (i.e., images of real-world objects) on a shelf in an augmented reality view on the display relative to items actually present on the shelf.

Step 830 includes allowing a user to select at least one of the virtual inventory items represented on the display. One should appreciate that the user can also select an item that is physically present via the display as well. As an example, consider a scenario where a user captures an image of a store shelf populated with a specific brand of products with their camera-enabled tablet computer (e.g., smart phone, iPhone, Galaxy tablet, etc.). The image could be a still image, video data, or even a live real-time image. The tablet's display can use the image data to derive image characteristics, which can then be used to recognize the product brand. In response, the tablet can obtain a virtual planogram from the planogram sever where the planogram is configured to allow presentation of the existing physically present products along with additional virtual items superimposed on the image and neighboring images of the physically present items. Thus, the display presents a virtual or augmented reality shopping experience according to the planogram. One should appreciate that the virtual inventory items, which can be real-world products available for purchase, could be alternative products from the same brand, be products from alternative brands, include sales items, include promotion items, or include other types of items.

Step 840 includes configuring a transaction device to receive account data associated with the user and related to the selected inventory item. The account data can include a broad spectrum of information and can depend on the nature of the transaction. For financial transactions, the account data could include bank account identifier, credit card numbers, security tokens, price information, number of units to purchase, SKUs, or other information. For non-financial transactions, the account data could include network addresses, user name, passwords, security keys (e.g., public encryption key, etc.), or other types of information sometimes required for the non-financial transaction. Example non-financial transactions could include making reservations (e.g., hotel, travel, restaurant, etc.), making appointments, interactions among software packages, protocol transactions, a check-in, or other types of interactions.

Step 850 includes initiating a transaction (e.g., over a network), via the transaction device, using a transaction protocol based on the account data. One should appreciate that a transaction can be initiated by the user's device, through a point of sales terminal (e.g., cash register, credit card reader, NFC device, bar code scanner, etc.), a back end product management server, the planogram server, or other component within the ecosystem. In some embodiments, the full transaction is carried out by the transaction device while in other embodiments the full transaction can be carried out by one or more other devices, or the transaction device and one or more other devices. For example, a person can enter their account information into their cell phone, which in turn interactions with a point-of-sales device via NFC. The point-of-sales device communicates with one or more back end servers operated by a bank or credit card company. Confirmation for the transaction is then sent back to the point-of-sales device and then presented to the person on their cell phone via the NFC communications link.

Purchasing a virtual inventory item via the display does not necessarily result in the purchaser receiving a physical product at the point of purchase. Therefore in some scenarios, as suggested by step 860, the methods can include initiating a delivery of the selected inventory item to a destination location, possibly selected by the user. For example, the account data or other user data provided to the transaction device can include a shipping address. When the transaction is initiated, the shipping address can be forwarded to the fulfillment component of the transaction system. The fulfillment component could include a warehouse, vendor, retailer, on-line site (e.g., Amazon, Ebay, etc.), or other component capable of shipping the physical products. In some embodiments, the physical item does not yet exist. As discussed previously, one aspect of delivery of the inventory item can include printing the item or a proxy of the item for the purchaser. The item or proxy could be printed using a 3D printer.

Figure 9A:
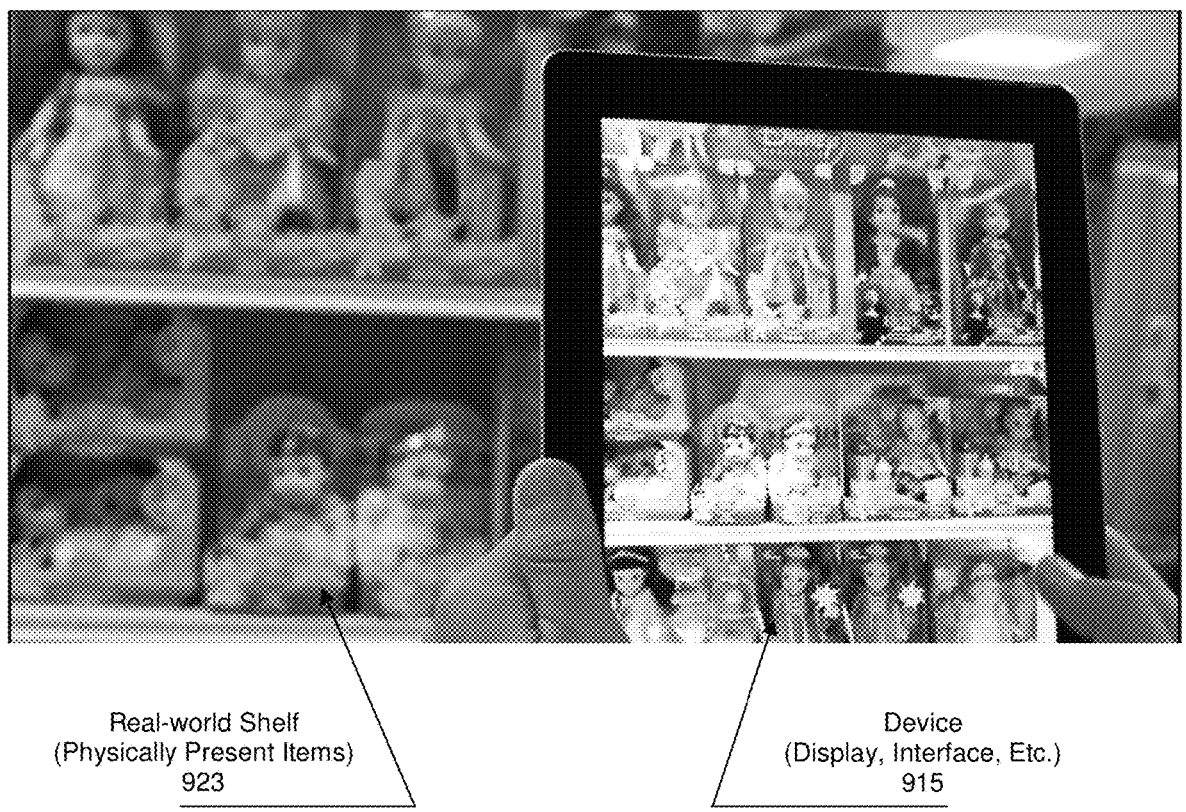
FIG. 9A illustrates a real-world application of a 3D virtual planogram in a physical location.
Figure 9B:
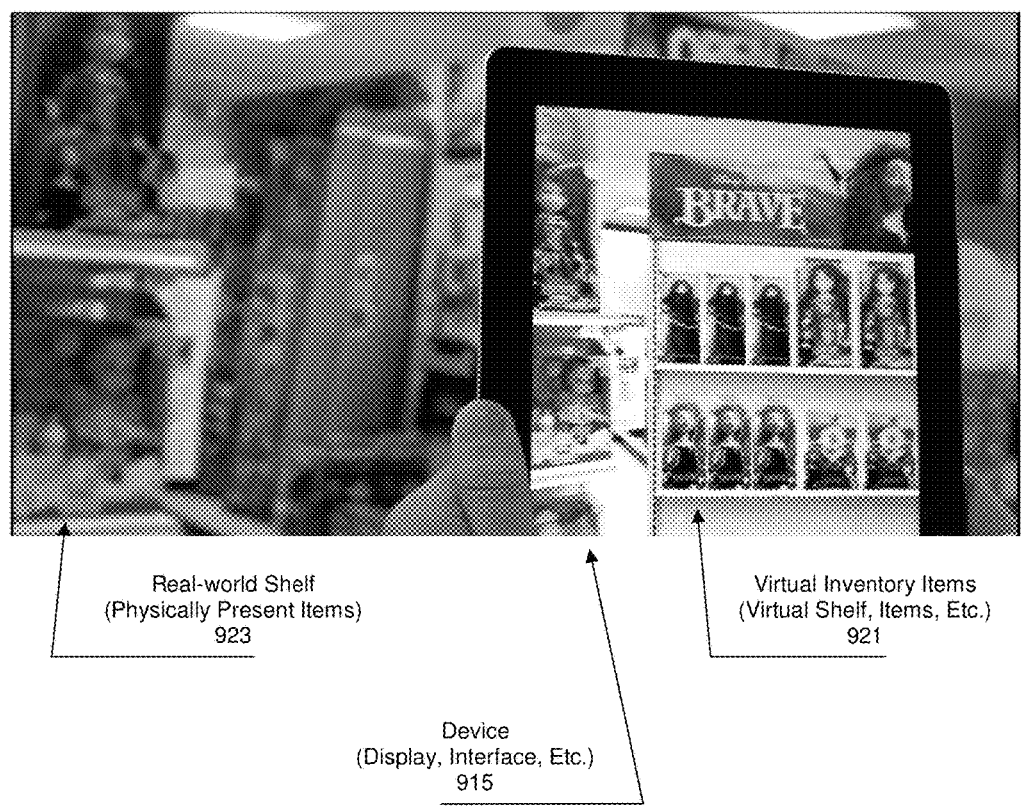
FIG. 9B illustrates presentation of virtual inventory items within the physical location of FIG. 9A as dictated by the 3D virtual planogram.

FIGS. 9A and 9B illustrate a real-world application of a virtual application in a physical real-world location. The photographs within FIGS. 9A and 9B are frames from a proprietary video illustrating use of the inventive subject matter. In FIG. 9A a person uses camera-enabled device 915, a tablet computer, to capture an image of a real-world shelf 923 having a collection of physically present items, toy dolls in this example. There are several points of note. First, physical shelf 923 lacks space for additional items. Second, the shelf displays items from a specific brand (e.g., Disney®). Third, although difficult to see, just right of the shelf is another aisle in the physical location. Although the physical location could be an actual retailer establishment, in this example the physical location is a private location, that is, a non-public location, constructed for prototyping the inventive subject matter.

Device 915 as illustrated is instrumented with multiple aspects of the inventive subject matter. More specifically, device 915 comprises a recognition module configured to covert the image data into a one or more image features (e.g., SIFT, BRISK, vSLAM, etc.) that can be used to recognize shelf 923 or the physically present items. Device 915 uses the image features to select one or more virtual planograms over a network connection from a planogram server. One should appreciate that the planogram server functionally could be deployed within device 915 as an app where the planogram server could pre cache relevant virtual planograms within device 915 based on device GPS location or other factors. Regardless of the source of the virtual planogram, as the person begins panning to the right, the virtual planogram causes device 915 to present products accordingly.

In FIG. 9B, device 915 has been panned to the right. The right edge of real-world shelf 923 is visible at the left of the frame. Further, between the right edge of real-world shelf 923 and the left edge of device 915 one can see the vacant aisle within the physical location. However, device 915 does not present an image of the aisle. Rather, device 915 presents an image of a portion of shelf 923 and images of virtual inventory items 921. Virtual inventory items 921 are placed relative to shelf 923 and include additional purchasable items that are not physically present in the physical location. Placement of virtual inventory items 921 are arranged according to the virtual planogram triggered by the image features derived from the image of real-world shelf 923. The person can now interact with virtual inventory items 921 by simply tapping on a desired product.

One should appreciate that virtual inventory items 921 are presented on a virtual shelf, which can be considered to virtually expand the shelf space in the physical location by ten, twenty, fifty, a hundred, or even a thousand or more times. In addition, real-world shelf 923 only presents a single set of toys associated with a single franchise (e.g., Disney baby princesses) while virtual inventory items 921 allows for expanding on the products available to the person by offering products from another franchise (e.g., Brave® movie products). Still further, the shopping experience of the user is expanded to traditionally unavailable space, for example, the aisle space in this embodiment.

Although not illustrated, the virtual planogram controls presentation of items 921 in a full 360 degree experience. As the person continues to pan around beyond the Brave display, additional items become visible. This can be achieved by device 915 registering background features from the image data and combining the registered background features with inertial movement of the device from accelerometer data obtained from an accelerometer. The combined data sets can then be used to generate high precision position and orientation information of device 915 so that virtual inventory items 921 are displayed properly where they are superimposed on irrelevant background items (e.g., the aisle), while not overlapping with relevant items (e.g., physically present items on real-world shelf 923). Such precision can be obtained through application of the previously mentioned vSLAM algorithms. It should be appreciated that such control of placement is governed by the rules or policies of the virtual planogram. Thus, the virtual planogram can control arrangement of visible or non-visible items as registered by physical features in the physical location.

The approach illustrated in FIGS. 9A and 9B gives rise to numerous advantageous. One advantage includes allowing virtual planograms to overlap. For example, the user could image a set of neighboring products, which can trigger a new virtual planogram that causes presentation of a new set of virtual inventory items in place of virtual inventory items 921. Thus, the virtual planograms can be considered to be layered or overlapping where the active planogram is triggered by the current sensor data. Another advantage includes allowing the retailer to participate in sales of virtual inventory items 921. If the user purchases one of items 921, the retailer at the physical location can be credited even though they did not have the item present. Yet another advantage includes allowing the planogram manager to dynamically interact with the user via the virtual planogram in real-time. For example, the planogram manager can grant "award" points to the purchaser upon purchase, speak or chat directly with the purchaser, request survey information, or have other types of interaction(s). Still further, virtual items 921 can be changed according to the current circumstances possibly based on user preferences, proximity of other users, geo-location, time, news events, or other factors.

Another example use case could include construction of a virtual store shelf based on available products offered via other retailers. For example, products offered by Amazon, eBay, Barnes and Noble, or other on-line retailers can be aggregated together or individually to give rise to a virtual shopping experience. Consider eBay as an example. A person could use their device to image a collectable action figure. In response, the device can contact a planogram sever, which in turn uses the image data to construct, in real-time, a virtual planogram of similar action figures available on eBay, possibly based on a template planogram. Such an approach allows a user to comparison shop in real time. Thus, the inventive subject matter is considered to include constructing a virtual planogram in sustainably real-time based on search results that are responsive to a query generated on contextual sensor data.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. The terms "coupled to" and "coupled with" are used euphemistically to mean "communicatively coupled with" where two or more elements are able to communicate with each other over a network possibly via one or more intermediary network devices.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A display device presenting an augmented reality shopping experience, comprising:
   a tangible, non-transitory computer readable memory storing software instructions;
   a display;
   a camera configured to capture an image of one or more product representations presented within a physical object or physical space; and
   at least one processor coupled with the memory and that, upon execution of the software instructions, is caused to:
   convert image data from the one or more product representations in the image into at least one image feature;
   obtain one or more virtual inventory items by using the at least one image feature to select from virtual inventory items based on availability for purchase via at least one retailer inventory, wherein the selected virtual inventory items are products related to the one or more product representations;
   configure the display using the one or more virtual inventory items, wherein the one or more virtual inventory items are presented as being available for purchase, and wherein configuring the display includes superimposing an augmented reality view comprising at least one of the one or more virtual inventory items and at least one of the one or more product representations on a real-world image within the display;
   allow a user to select at least one virtual inventory item of the one or more virtual inventory items;
   configure a transaction device to receive account data associated with the user and related to the selected at least one virtual inventory item; and
   initiate a transaction using the account data and a transaction protocol to communicate with the transaction device for carrying out a transaction which includes, in a case where the at least one selected virtual inventory item exists in the at least one retailer inventory, an order for delivery of the at least one selected virtual inventory item to a destination, and, in a case where the at least one selected virtual inventory item does not exist in the at least one retailer inventory, taking an action to produce a proxy item.

2. The display device of claim 1, wherein the one or more virtual inventory items are obtained in a virtual planogram.

3. The display device of claim 2, further comprising a planogram manager interface configurable to allow a planogram manager to manage the virtual planogram.

4. The display device of claim 3, wherein the planogram manager interface is configurable to provide at least one of the following planogram management functionalities: create the virtual planogram, update the virtual planogram, create product placement rules, create event triggering rules, and instantiate the virtual planogram.

5. The display device of claim 2, wherein the obtaining is performed using a web server located remotely to the display device over a network.

6. The display device of claim 2, further configurable to modify the virtual planogram based on a triggering condition.

7. The display device of claim 6, wherein the triggering condition is based on at least one of the following: a news event, a user preference, a time, a location, a user identity, a logical operator, sensor data, a temperature, a fee, a trend, a weather condition, and a prior purchase.

8. The display device of claim 2, wherein the virtual inventory items are incorporated into the virtual planogram based on a fee.

9. The display device of claim 1, further comprising a vendor interface configurable to allow at least one of multiple vendors to manage their virtual inventory items.

10. The display device of claim 9, wherein the vendor interface is configurable to provide at least one of the following vendor management functionalities: pay a planogram fee, purchase a planogram slot, virtually rotate stock, filing a request, store vendor account information, store product information, and set vendor preferences.

11. The display device of claim 10, further comprising a transaction engine configurable to initiate a transaction associated with at least one of the virtual inventory items based on input received from a consumer via the display device.

12. The display device of claim 1, wherein the display device is further configured to obtain a position of the display device.

13. The display device of claim 12, wherein the position comprises a geographic location.

14. The display device of claim 13, wherein the geographic location comprises a GPS location of the display device.

15. The display device of claim 1, wherein the display device comprises at least one of the following: a mobile phone, a tablet computer, a television, and a kiosk.

16. The display device of claim 1, wherein the one or more virtual inventory items comprise overlapping virtual inventory items that layers over virtual inventory items.

17. The display device of claim 1, further comprising a virtual inventory item database.

18. The display device of claim 1, wherein, in the case that the at least one inventory item does not exist, the transaction further includes a printing of the proxy item.

19. A method for presenting an augmented reality shopping experience from a display device, the method comprising:
   capturing, in a computer, an image of one or more product representations from the display device, represented within a physical object or space;
   converting, by the computer, image data from the one or more product representations in the image into at least one image feature;
   obtaining, by the computer, one or more virtual inventory items by using the at least one image feature to select from virtual inventory items based on availability for purchase via at least one retailer inventory, wherein the selected virtual inventory items are products related to the one or more product representations;

configuring, by the computer, a display of the display device using the one or more virtual inventory items, wherein the one or more virtual inventory items are presented as being available for purchase, and wherein configuring the display includes superimposing an augmented reality view comprising at least one of the one or more virtual inventory items and at least one of the one or more product representations on a real-world image within the display;

allowing, by the computer, a user to select at least one virtual inventory item of the one or more virtual inventory items;

configuring a transaction device to receive account data associated with the user and related to the selected at least one virtual inventory item; and initiating, by the computer, a transaction using the account data and a transaction protocol to communicate with the transaction device for carrying out a transaction, which includes, in a case where the at least one selected item exists in the at least one retailer inventory, an order for delivery of the selected item to a destination, and, in a case where the at least one selected item does not exist in the at least one retailer inventory, taking an action to produce a proxy item.

20. The method of claim 19, wherein, in the case that the at least one inventory item does not exist, the transaction further includes a printing of the proxy item.

21. A non-transitory computer readable medium containing program instructions for causing a computer to perform steps comprising:

capturing, in a computer, an image of one or more product representations from a display device, represented within a physical object or space;

converting, by the computer, image data from the one or more product representations in the image into at least one image feature;

obtaining, by the computer, one or more virtual inventory items by using the at least one image feature to select from virtual inventory items based on availability for purchase via at least one retailer inventory, wherein the selected virtual inventory items are products related to the one or more product representations;

configuring, by the computer, a display of the display device using the one or more virtual inventory items, wherein the one or more virtual inventory items are presented as being available for purchase, and wherein configuring the display includes superimposing an augmented reality view comprising at least one of the one or more virtual inventory items and at least one of the one or more product representations on a real-world image within the display;

allowing, by the computer, a user to select at least one virtual inventory item of the one or more virtual inventory items;

configuring a transaction device to receive account data associated with the user and related to the selected at least one virtual inventory item; and initiating, by the computer, a transaction using the account data and a transaction protocol to communicate with the transaction device for carrying out a transaction, which includes, in a case where the at least one selected item exists in the at least one retailer inventory, an order for delivery of the selected item to a destination, and, in a case where the at least one selected item does not exist in the at least one retailer inventory, taking an action to produce a proxy item.

22. The method of claim 21, wherein, in the case that the at least one inventory item does not exist, the transaction further includes a printing of the proxy item.

* * * * *